(12) United States Patent
Pruneri

(10) Patent No.: US 9,573,092 B2
(45) Date of Patent: Feb. 21, 2017

(54) MACHINE FOR GAS PRODUCTION

(71) Applicant: Marco Pruneri, Laives (IT)

(72) Inventor: Marco Pruneri, Laives (IT)

( * ) Notice: Subject to any disclaimer, the term of this patent is extended or adjusted under 35 U.S.C. 154(b) by 14 days.

(21) Appl. No.: 14/646,555

(22) PCT Filed: Nov. 26, 2013

(86) PCT No.: PCT/EP2013/003568
§ 371 (c)(1),
(2) Date: May 21, 2015

(87) PCT Pub. No.: WO2014/082736
PCT Pub. Date: Jun. 5, 2014

(65) Prior Publication Data
US 2015/0298047 A1 Oct. 22, 2015

(30) Foreign Application Priority Data
Nov. 29, 2012 (IT) .............................. MI2012A2038

(51) Int. Cl.
*B01D 53/04* (2006.01)
*B01D 53/047* (2006.01)

(52) U.S. Cl.
CPC ....... *B01D 53/0446* (2013.01); *B01D 53/0407* (2013.01); *B01D 53/047* (2013.01); *B01D 53/0423* (2013.01)

(58) Field of Classification Search
CPC .............. B01D 53/047; B01D 53/0423; B01D 53/0446; B01D 53/0407
USPC ...................................... 96/121; 128/205.27
See application file for complete search history.

(56) References Cited

U.S. PATENT DOCUMENTS

| 4,956,138 | A | * | 9/1990 | Barfield | .................. B29C 70/82 |
| | | | | | 264/129 |
| 5,275,642 | A | * | 1/1994 | Bassine | ............. B01D 53/0415 |
| | | | | | 96/133 |
| 5,549,736 | A | | 8/1996 | Coffield et al. | |
| 5,827,354 | A | * | 10/1998 | Krabiell | ............. B01D 53/0415 |
| | | | | | 95/130 |
| 6,016,849 | A | * | 1/2000 | Harget | .................. B29C 47/065 |
| | | | | | 138/137 |

(Continued)

FOREIGN PATENT DOCUMENTS

FR 2550466 A1 2/1985

*Primary Examiner* — Frank Lawrence
(74) *Attorney, Agent, or Firm* — R. Neil Sudol; Henry D. Coleman

(57) ABSTRACT

A machine (1) for gas production, including one or more cylindrical members (2), each of which is associated with two heads that are fixed to the ends of each one of the cylinders (2); adjacent heads, associated with adjacent cylinders, being mutually connected to form a modular manifold; wherein each one of the heads is provided monolithically and made of plastic material by injection molding. The head made of plastic material allows to provide specific tanks for providing onsite gas generators. The advantages of the machine, which is preferably but non-limitatively made of high-density polyethylene or glass-reinforced polypropylene, are: low cost of the raw material and of the molding process, wide and easy availability of the raw material, high repeatability of the production process and very short production times, as well as very low production costs for each manufactured object.

9 Claims, 10 Drawing Sheets

(56) References Cited

U.S. PATENT DOCUMENTS

| | | | |
|---|---|---|---|
| 7,172,693 B2 * | 2/2007 | Reid | B01D 35/301 |
| | | | 210/232 |
| 7,763,102 B2 * | 7/2010 | Lomax, Jr. | B01D 53/0407 |
| | | | 96/121 |
| 8,152,910 B2 * | 4/2012 | Zanni | B01D 53/0446 |
| | | | 96/121 |
| 9,364,783 B2 * | 6/2016 | Walker | B01D 53/0407 |

* cited by examiner

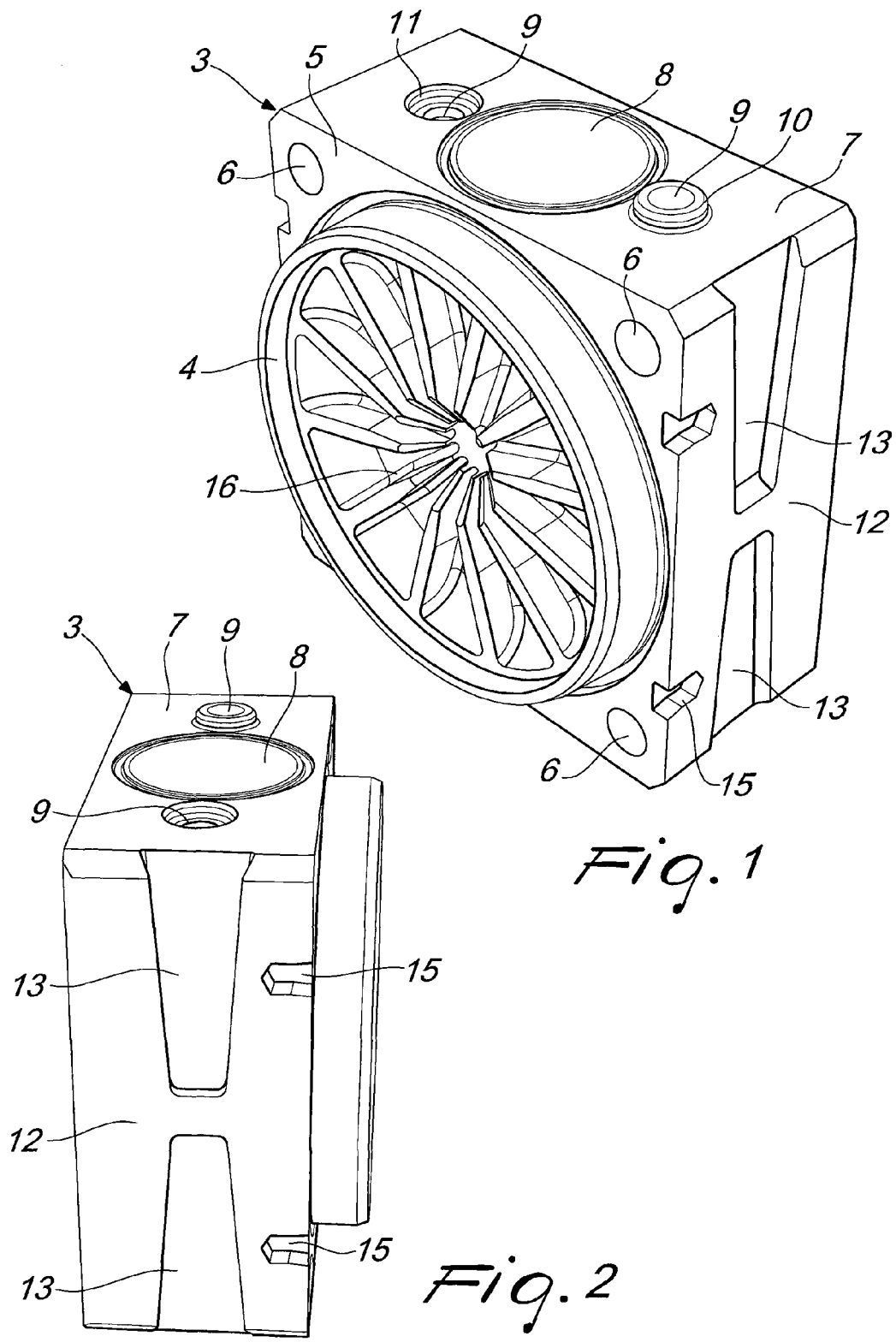

MACHINE FOR GAS PRODUCTION

BACKGROUND OF THE INVENTION

The present invention relates to a machine for gas production.

As is known, a typical apparatus for the production of gas, a so-called onsite generator, for example of $O_2$ or $N_2$, is constituted by one or more tanks, which usually have a cylindrical shape, made of metal, such as alloys of iron, aluminum or steel, which, by working in an alternating cycle, essentially follow the classic operating cycle of a machine of the PSA (Pressure Swing Adsorber) type.

Briefly, in the PSA cycle, an active ingredient contained in the tank is subjected to two alternating steps, characterized by different pressures: a first step at high pressure, called adsorption step, in which the active ingredient contained in the tank is placed in contact with a gas mix, from which a component is to be extracted, and a second low-pressure step, a desorption step, in which the active material, saturated during the preceding step, releases the previously retained gaseous component.

The tanks are designed to work under fatigue conditions with alternating pressure cycles for many years.

Of course, by increasing the capacity of a tank it is possible to provide machines containing a larger quantity of active ingredient and accordingly it is possible to provide onsite generators with greater performance.

To increase the dimensions of a tank it is possible to increase its height and/or diameter.

Whereas by increasing its height, for equal pressures involved, it is not necessary to revise the thickness of the walls of the tank, as the diameter of the tanks is increased, due to the physical law that ties pressure to force ($F=p\times A$), in order to have the same mechanical strength and safety at the same operating pressures it is necessary to increase the thickness of the shell of the tanks, with a consequent nonlinear increase in the quantities of materials used, in process difficulties and in logistical difficulties in their manufacture.

OBJECTS OF THE INVENTION

The aim of the present invention is to provide a machine for gas production that has a low cost of the raw material and of the manufacturing process.

Within the scope of this aim, an object of the invention is to provide a machine that can be manufactured with a raw material that is widespread and easily available.

Another object of the invention is to provide a machine that can be manufactured with a manufacturing process that is highly repeatable and with reduced production times, as well as with extremely low production costs for each manufactured product.

Another object of the present invention is to provide a structure which, by virtue of its particular constructive characteristics, is capable of giving the greatest assurances of reliability and safety in use.

SUMMARY OF THE INVENTION

This aim and these and other objects that will become better apparent hereinafter are achieved by a machine for gas production, comprising one or more cylindrical members, each of which is associated with two heads that are fastened to the ends of each of said cylinders; adjacent heads, associated with adjacent cylinders, being mutually connected to form a modular manifold; said machine being characterized in that each of said heads is provided monolithically and made of plastics by injection molding.

BRIEF DESCRIPTION OF THE DRAWINGS

Further characteristics and advantages will become better apparent from the description of preferred but not exclusive embodiments of the invention, illustrated by way of non-limiting example in the accompanying drawings, wherein:

FIG. 1 is a perspective view of a head of the machine according to the present invention, particularly for metallic cylinders;

FIG. 2 is a side perspective view of the head of FIG. 1.

DETAILED DESCRIPTION

Figure 3:
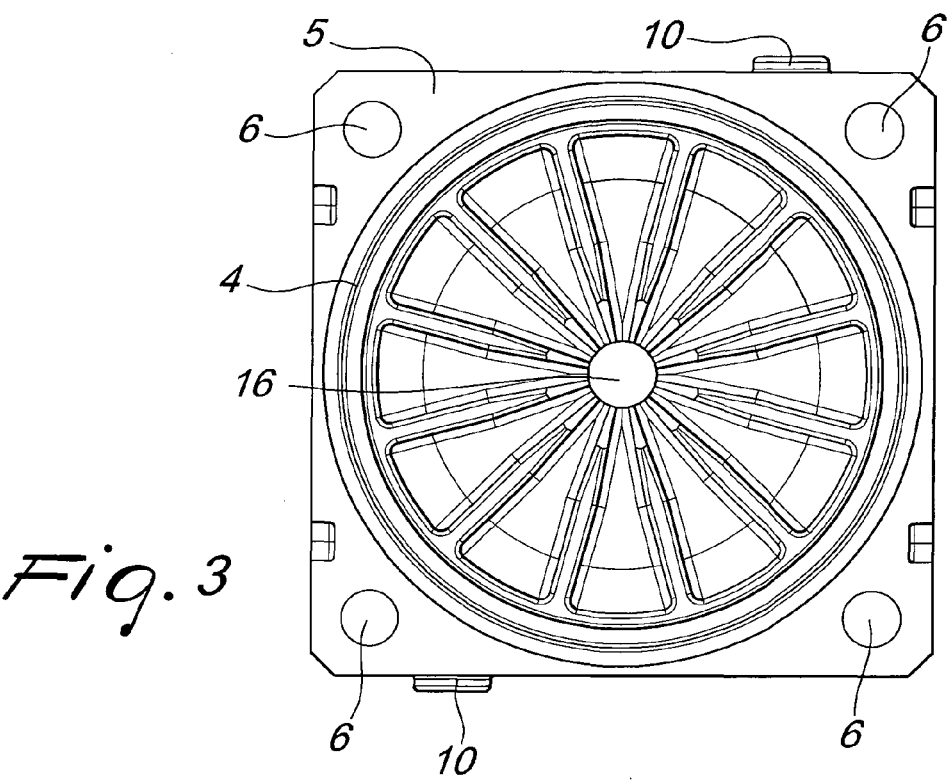
FIG. 3 is a plan view of the head of FIG. 1.
Figure 4:
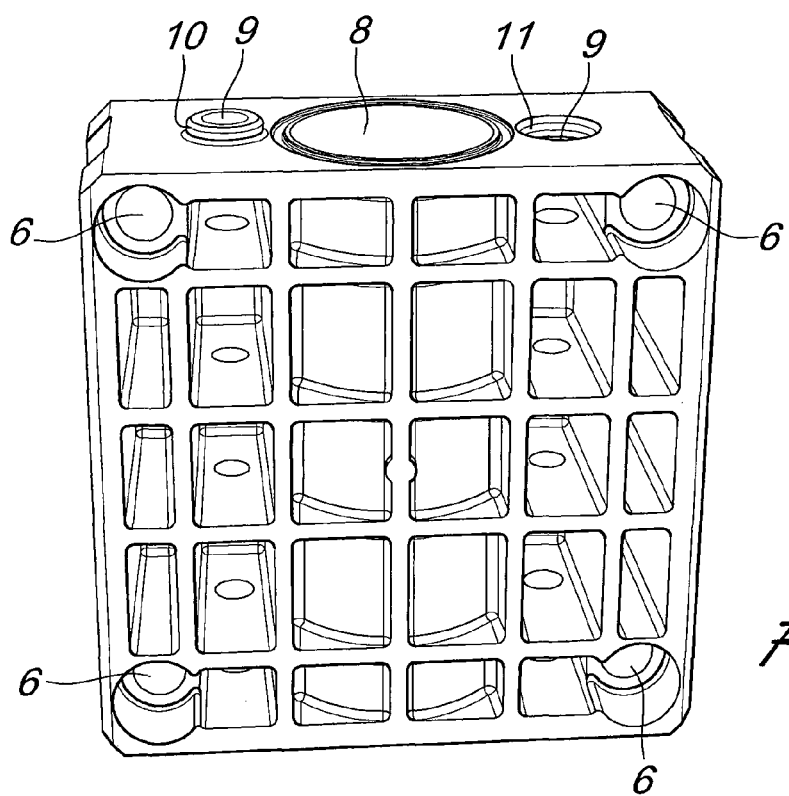
FIG. 4 is a rear perspective view of FIG. 1.
Figure 5:
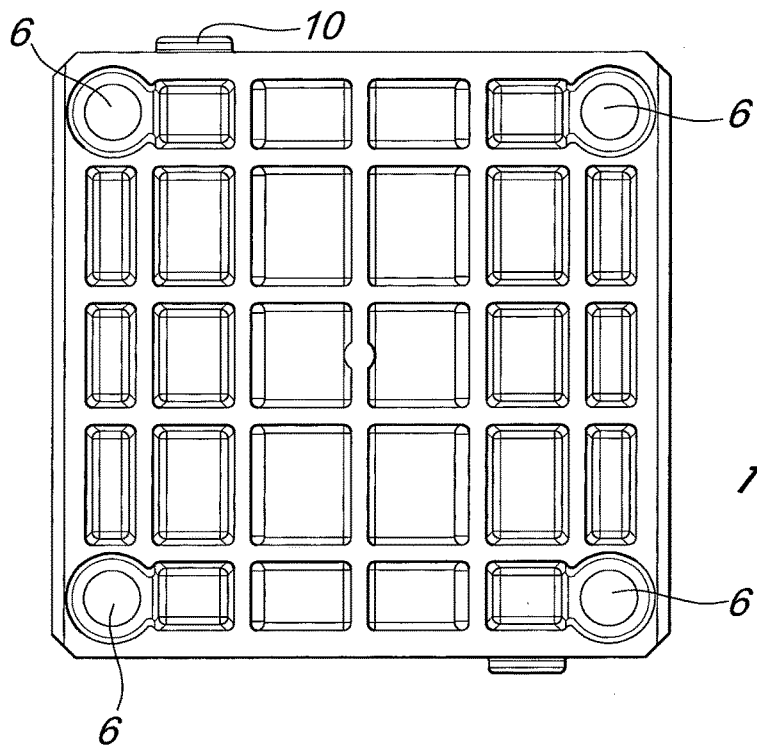
FIG. 5 is a rear view of the head of FIG. 1.
Figure 6:
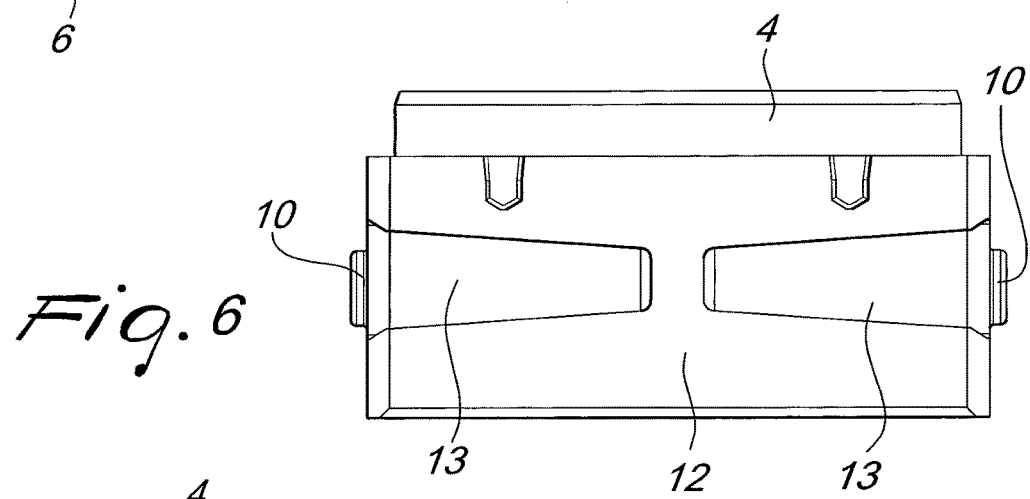
FIG. 6 is a side view of a side of the head of the preceding FIG. 1.
Figure 7:
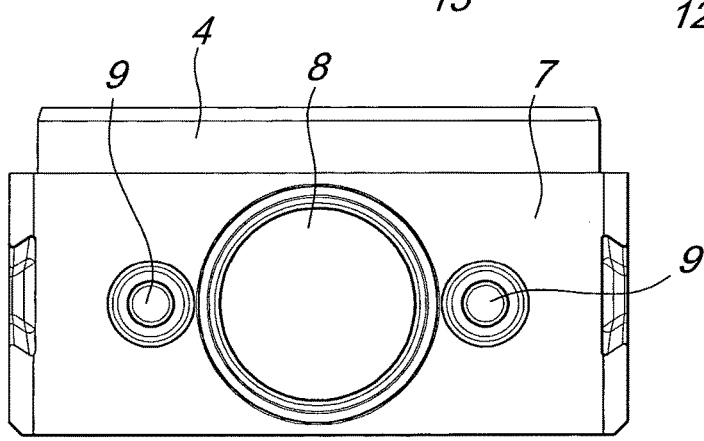
FIG. 7 is a side view, from the manifold side, of the head of FIG. 1.
Figure 8:
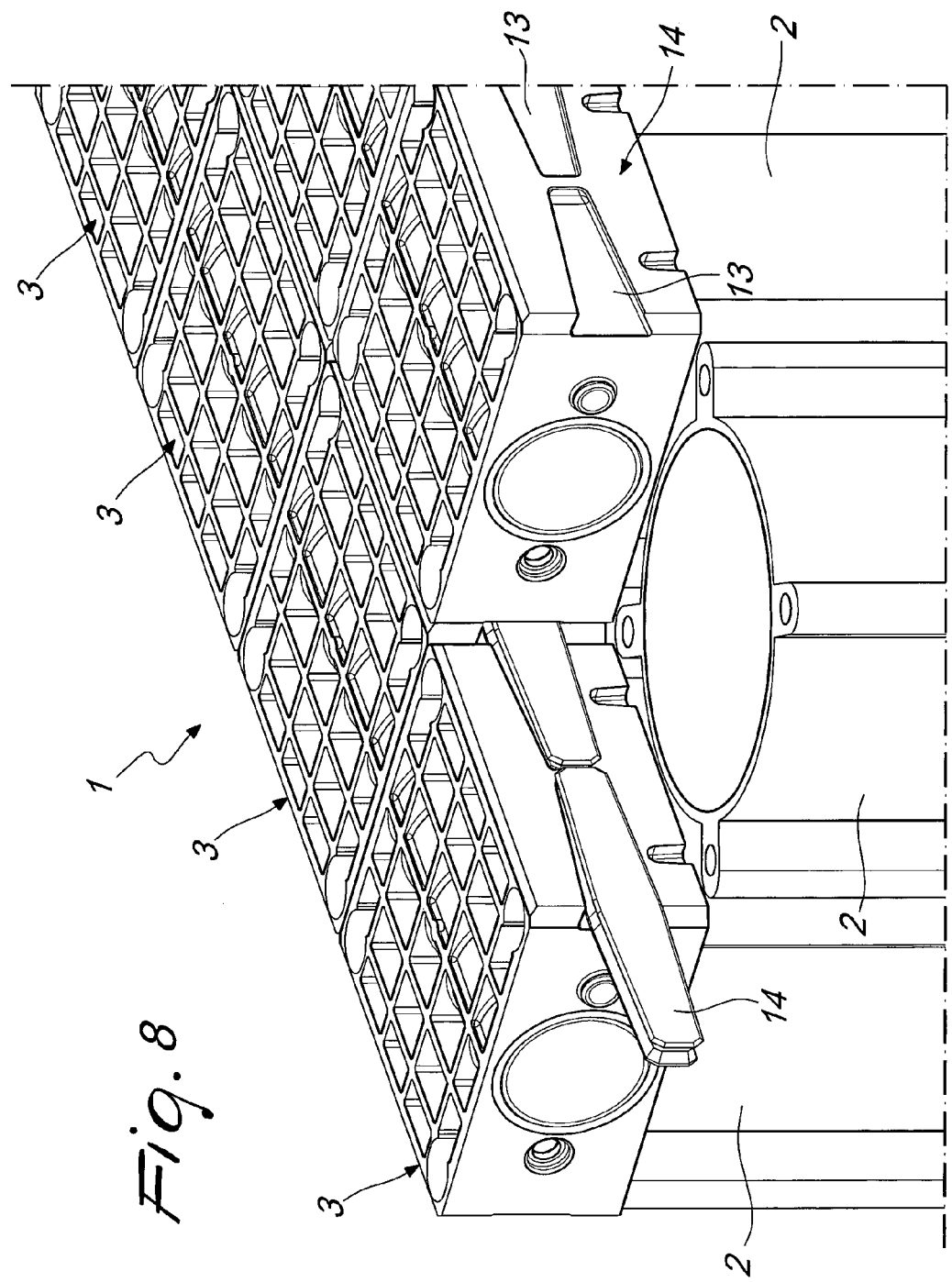
FIG. 8 is a partial perspective view of a portion of the machine according to the present invention.
Figure 9:
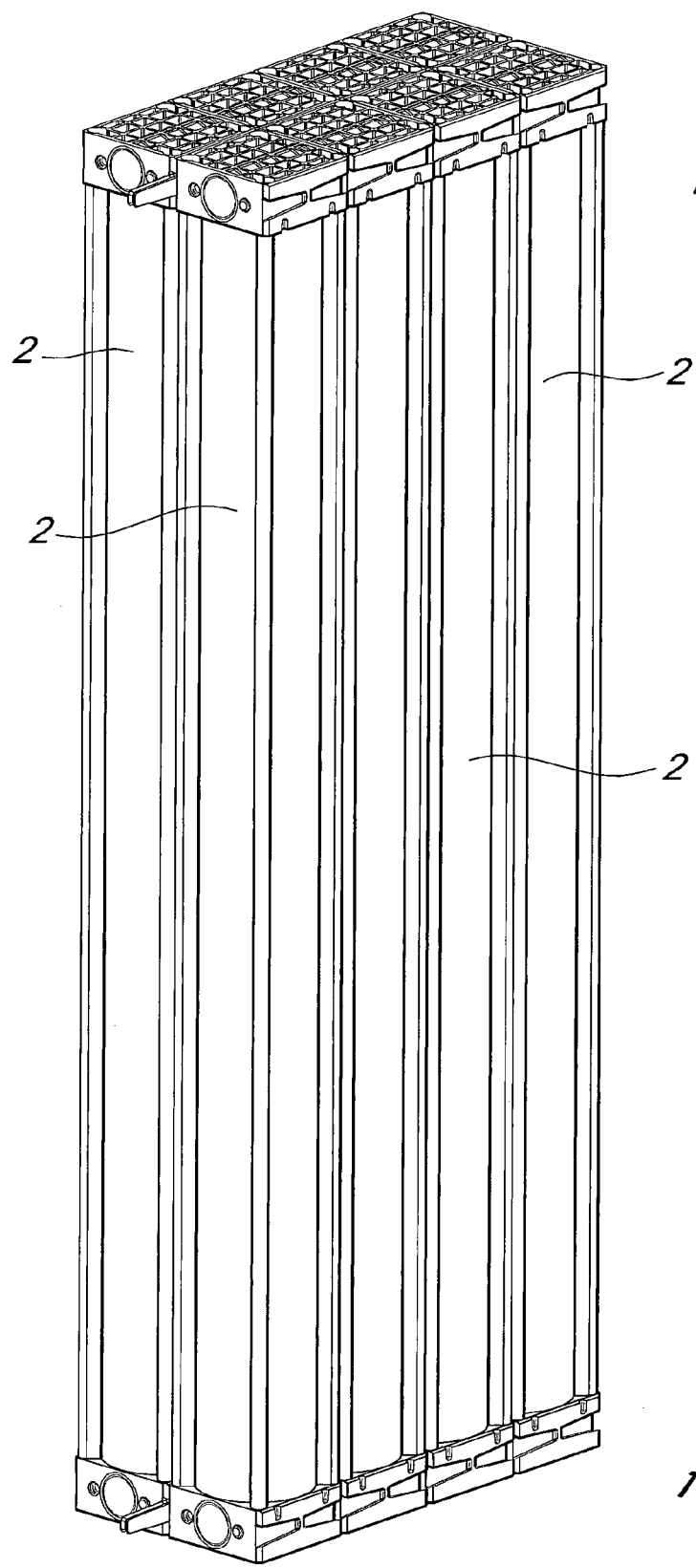
FIG. 9 is a perspective view of the machine according to the present invention.

With reference to the cited figures, the machine according to the invention, generally designated by the reference numeral 1, has one or more cylindrical members 2, each of which is associated with two heads 3 which are fixed to the ends of the cylinder 2.

The adjacent heads 3 of two laterally adjacent cylinders are mutually connected in order to form a modular manifold that allows to join a plurality of cylinders 2 to form a structure 1, according to the present invention.

According to the present invention, the head 3 is constituted by a single body made of plastics by injection molding.

The head 3 includes a coupling 4, constituted by a shank that is arranged on a coupling side 5 of the body of the head 3, for the fixing of an end of a cylinder 2.

Holes 6 are also provided, on the same coupling side 5, for fixing the cylinder 2 by means of fastener members such as screws and the like.

The head 3 is designed particularly for use with metallic cylinders 2, preferably made of aluminum.

The head 3 has two manifold sides 7, each of which is provided with a manifold port 8. The manifold ports 8 connect two or more mutually adjacent heads.

A central port 16 connects the manifold ports 8 to the cylinder 2 associated with the coupling 4.

The manifold side 7 is also provided with a pair of through holes 9 for fastening the heads by means of threaded bars, that are not visible in the figures.

In each manifold side 7, one of the through holes 9 has an annular centering pin 10, which is adapted to engage a corresponding annular seat 11 of the other through hole 9 of an adjacent head 3.

The head 3 is provided with two sides 12, provided with respective seats 13 for keys 14 for the lateral fixing and longitudinal centering of the heads with respect to each other.

The sides 12 of the head also have seats 15 for anchoring the head of the structure and for handling.

FIGS. 10-16 are views of a machine 101 that is substantially similar to the machine 1 of FIGS. 1-9, which includes heads 103 designed particularly for use with cylinders 102 made of plastics, for example ordinary pipes made of polyethylene and/or polypropylene, of the commercially available type.

In FIGS. 10-16, the same reference numerals used in FIGS. 1-9 designate similar members.

The head 103 includes a coupling 104 provided with seats 144 for leads for electro-welding.

The coupling 104 is provided with calibrated holes 116 to optimize the internal flow between the cylinder 102 and the manifolds 8.

The head 103 also comprises electrical contacts 117 for the connection of the electro-welding members.

The machine according to the present invention allows to build specific tanks for the provision of onsite gas generators, using exclusively plastic materials and an injection molding process.

Preferably, the structure is made of high-density polyethylene, which has a low cost as a raw material and is widespread and easily available for the molding process.

Another material that is advantageously usable is glass-reinforced polypropylene.

The plastic material also allows a high repeatability of the production process and very short production times as well as extremely low production costs for each object manufactured.

The main advantages that arise from the use of plastics in the manufacturing of the terminals and/or in any case in the specific tanks for the provision of onsite gas generators, with respect to the classic use of terminals and tanks made of metal, are various and numerous.

First of all, a tank completely made of plastics is characterized by the particularities and strength points of plastics.

The machine made of plastics allows a drastic reduction in the costs of the material of the various components of the tank and in production times and costs of the various components of the tank.

There is also a considerable reduction in the assembly times of the tank with respect to the assembly times of tanks made of metallic and/or ferrous materials.

Another advantage is constituted by the energy saving that is due to the operation for welding the plastic terminals to the shell, also made of plastic material, with respect to the welding of metal to metal.

The tanks made of plastics have the advantage of being completely free from corrosion, without the need to use additional and/or particular processes during production in order to implement protection.

The preferred system used to obtain the components of the structure, i.e., injection molding, allows to achieve, with "zero cost and zero time" in the process for molding the terminals of the tanks, specific members that will allow easy and quick assembly of the terminals to the shell of the individual tank.

In particular, the terminal made of plastics and the shell made of plastics allow to provide directly in the terminal the seat 144 for the resistance heater to be installed on the terminal, and this allows to electro-weld from the inside of the tank the terminal to the tank.

The welding of the terminals to the shell, from the inside of the tank, has the advantage of not leaving the weld exposed, since it is inside the tank.

Another advantage is constituted by the fact that welding occurs in a single step, over the entire circumference of the terminal, thus eliminating the problem of asymmetric deformations and tensions that normally occurare generated when an object is heated/spot-welded to another object.

Accordingly, the problems of conventional welds, for example changes in the dimensional and mechanical qualities of the assembly and/or of one of the two parts, are avoided.

Figure 10:
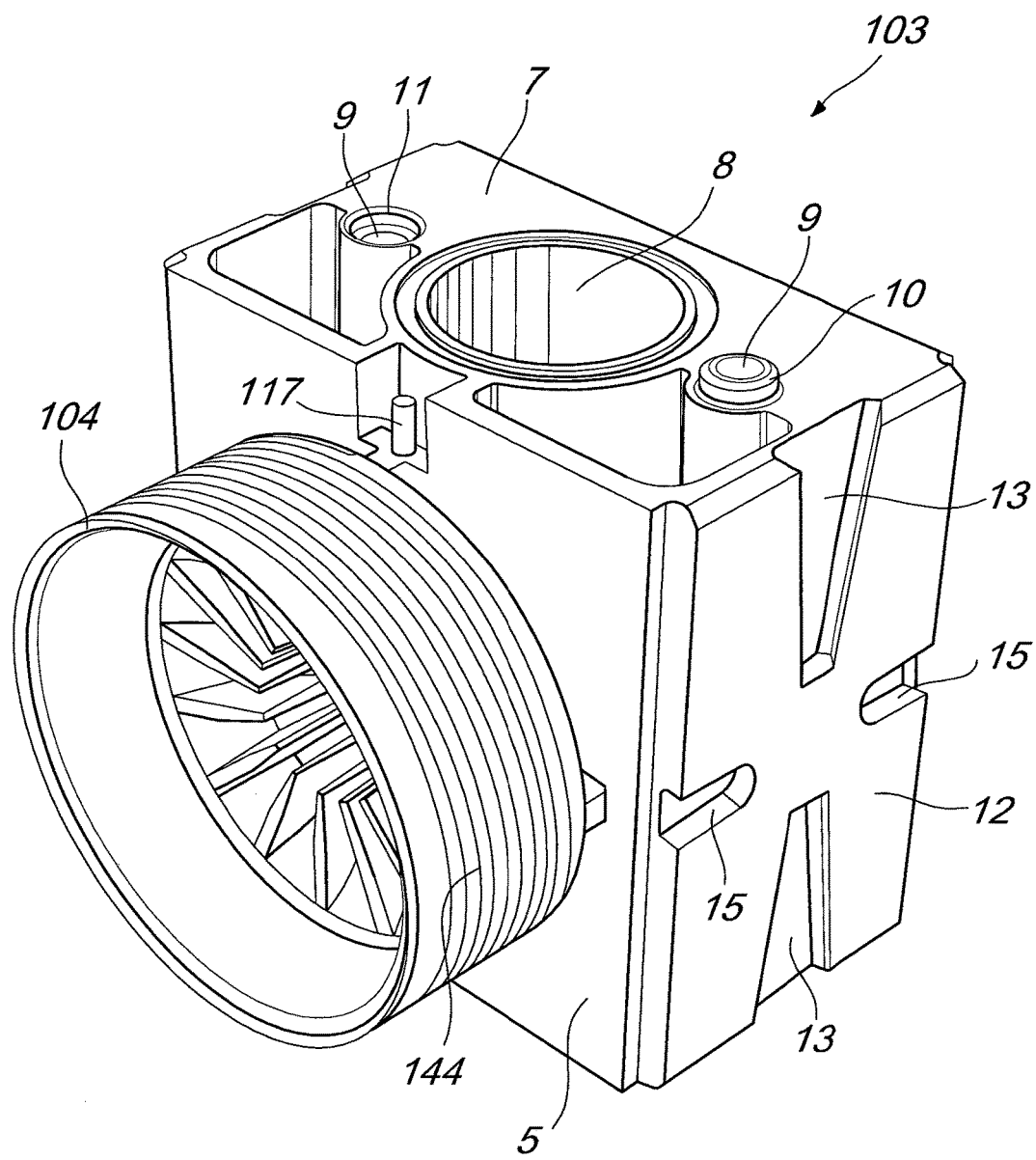
FIG. 10 is a perspective view of another head of the machine according to the present invention, particularly for cylinders made of plastic.
Figure 11:
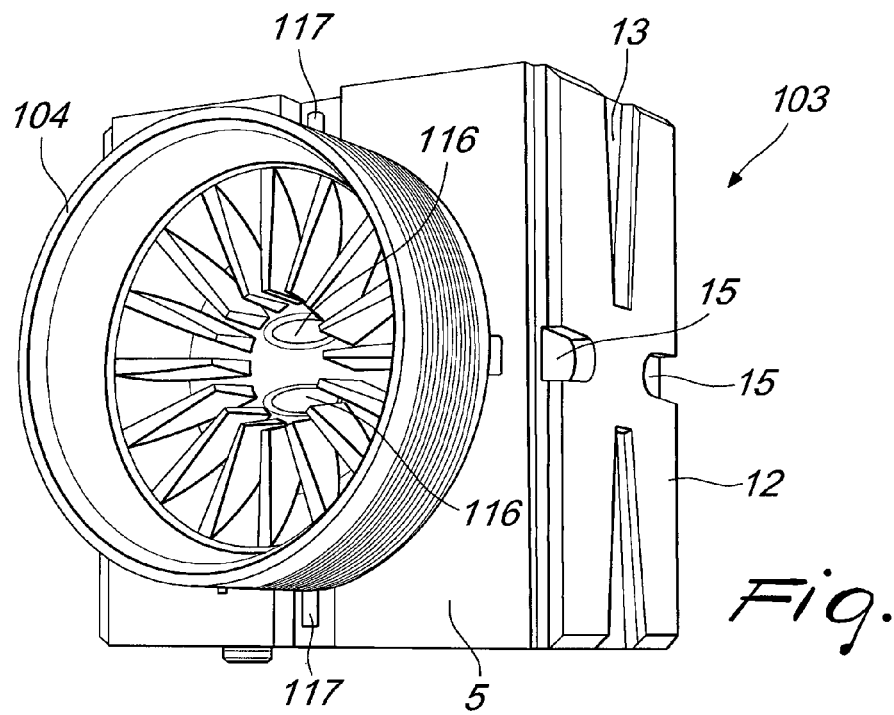
FIG. 11 is another perspective view of the head of FIG. 10.
Figure 12:
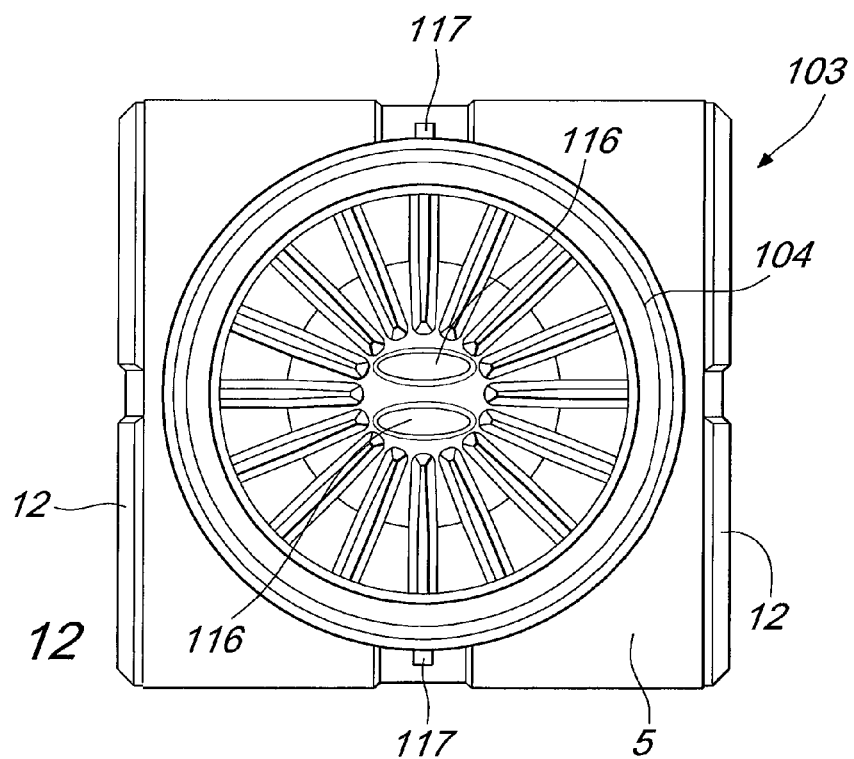
FIG. 12 is a plan view of the head of FIG. 10.
Figure 13:
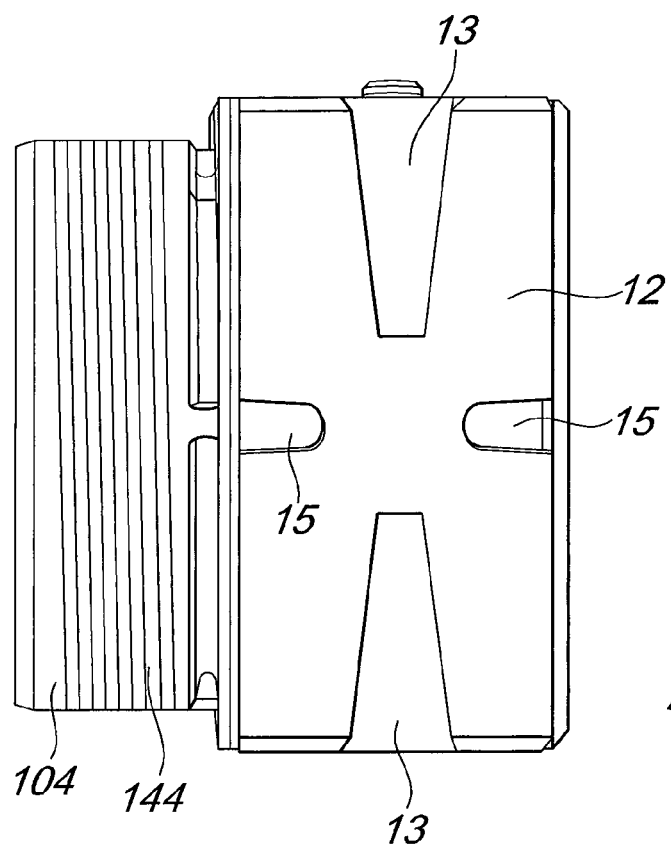
FIG. 13 is a side view of a side of the head of FIG. 10.
Figure 14:
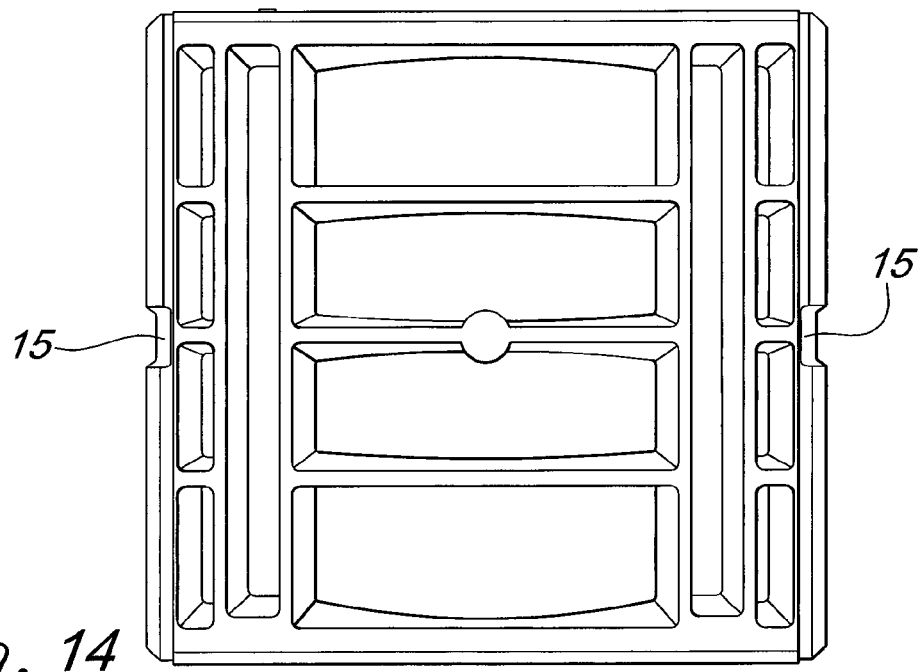
FIG. 14 is a rear view of the head of FIG. 10.
Figure 15:
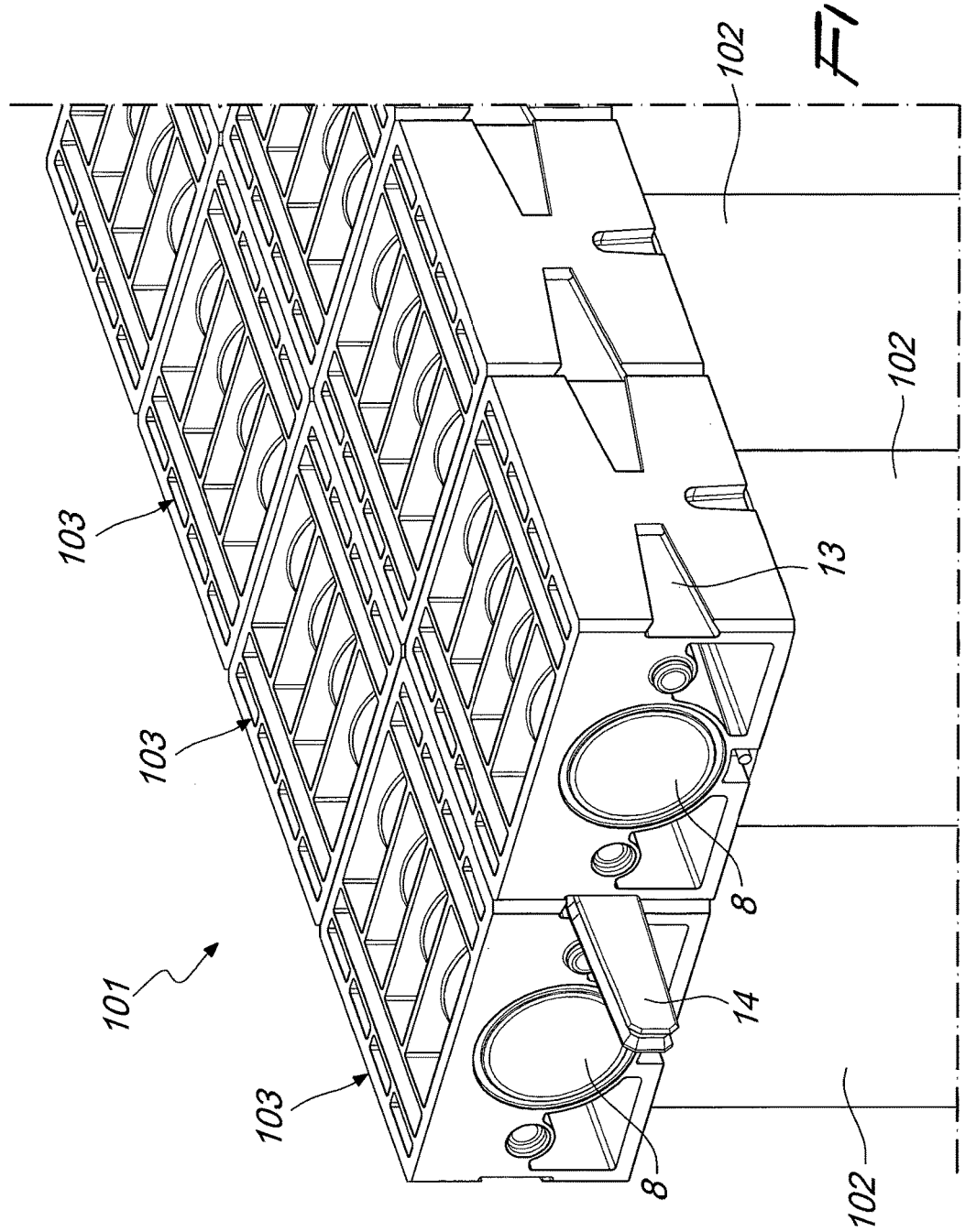
FIG. 15 is a partial perspective view of a portion of the machine provided with the head FIG. 10.
Figure 16:
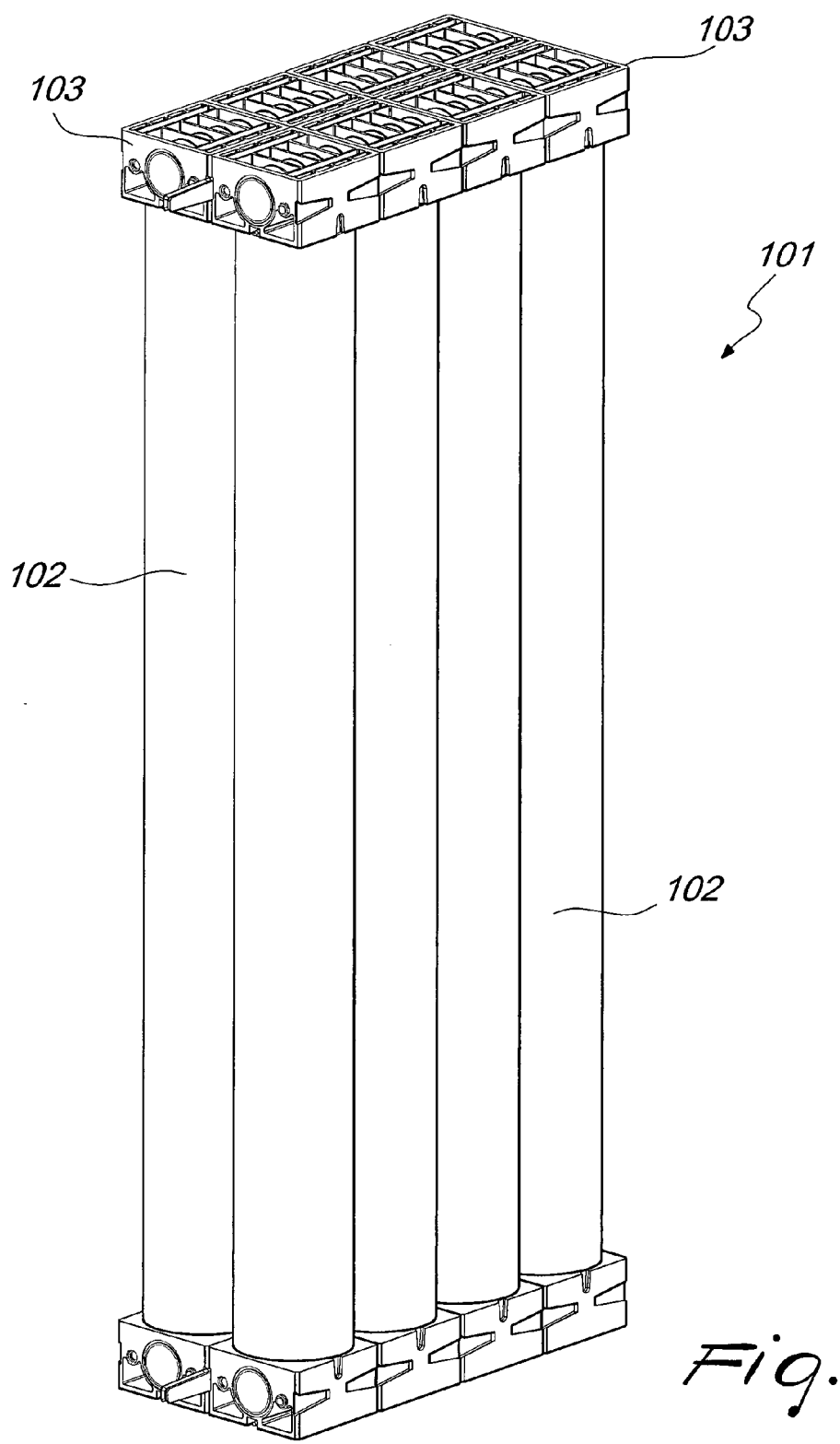
FIG. 16 is a perspective view of the machine of FIG. 10.

Also, according to the present invention, welding occurs on a very large area of overlap between the shell and the terminal, as it is evident by viewing the shank of FIG. 10. This region becomes therefore automatically the strongest region of the entire tank, provided by welding the two parts.

The welding process can be completed in a time that is a fraction of the time that would be required by welding, over the same length, two equivalent members made of metal and/or ferrous materials.

Since the welding temperatures are extremely low, oxidations cannot be generated in the welding region during the process.

Also, the injection molding process allows to provide in the head 3, 103, without subsequent processes, all the specific members in order to join stably the individual tanks and provide assemblies of tanks, tanks composed of assemblies of tanks having a smaller volume, which behave functionally and mechanically like a single tank having a larger volume.

The injection molding process also allows to provide, at "zero cost and time", in the process for molding the terminals of the tanks, members that allow easy assembly of the "composite tanks" to the structure/framework of on-site generators, so as to be able to reduce the manufacturing costs and times of an on-site gas generator.

Another characteristic of the present invention is the presence of the port 16, which constitutes a universal seat adapted to contain diffusers, which allow to provide inside the tanks optimized flows of gas as a function for example of the diameter, of the height of the tank and of the particle size of the material used.

According to the present invention it is also possible to provide the diffusers by integrating them in the head, directly in the molding process, such as for example the calibrated holes 116.

Mechanically, the heads 3 and 103, made of plastic material, according to the present invention, have different particular characteristics.

The parts provided by means of a molding process are lightened of all the material that is not necessary to achieve the desired mechanical properties of strength and rigidity and/or that is not necessary to achieve the various functions/functionalities achieved by the invention.

Accordingly, the quantity of plastic material used is optimized and is therefore the smallest possible as a function of what has been described above.

The plastic material used is characterized in that it has a very low hygroscopic index.

The plastic material used is characterized by high mechanical and dimensional stability as the temperature varies; accordingly, it can be used over a broad temperature range, typically from −10° C. to +60° C.

The plastic material used is adapted to be welded and is chosen specifically for use with electro-welding.

The plastic material used receives the addition of UV stabilizing agents.

This application claims the priority of Italian Patent Application No. MI2012A002038, filed on 29 Nov. 2012, the subject matter of which is incorporated herein by reference.

The invention claimed is:

1. A machine for gas production, comprising cylindrical members, each of which is associated with two heads that are fastened to the ends of each of said cylinders; adjacent heads, associated with adjacent cylinders, being mutually connected to form a modular manifold; wherein each of said heads is provided monolithically and made of plastics by injection molding, each of said heads comprising a coupling provided with seats for electro-welding conductors, each of said heads further comprising electrical contacts for connecting electro-welding members.

2. The machine according to claim 1, wherein each one of said cylinders is provided monolithically and made of plastics by extrusion.

3. The machine according to claim 1, wherein each given one of said heads comprises a means for joining to a respective one of said cylinders and to at least one adjacent head, provided monolithically with said given one of said heads.

4. The machine according to claim 1, wherein the respective coupling of each given one of said heads is arranged on a coupling side of a body of said given one of said heads, for fixing one end of one of said cylinders.

5. The machine according to claim 4, wherein said given one of said heads comprises two manifold sides, each of said manifold sides being provided with a manifold port; said manifold ports connecting two or more mutually adjacent heads; said given one of said heads comprising at least one central port or hole at said coupling, said at least one central port or hole connecting said manifold ports to said one of said cylinders associated with said coupling.

6. The machine according to claim 5, wherein each of said manifold sides comprises a pair of through holes for fixing said heads by means of threaded bars.

7. The machine according to claim 6, wherein one of said through holes on any given one of said manifold sides comprises an annular centering pin adapted to engage a corresponding annular seat of another through hole of an adjacent head.

8. The machine according to claim 1, wherein each of said heads comprises sides provided with respective seats for keys for the lateral fixing and longitudinal centering of said heads with respect to each other; said sides comprising furthermore seats for anchoring the respective one of said heads to the machine and for handling.

9. The machine according to claim 5, wherein said at least one central port or hole at said coupling comprises a plurality of calibrated holes for optimizing an internal flow between said one of said cylinders and said manifold ports.

* * * * *